(12) United States Patent
Chen

(10) Patent No.: US 7,973,709 B2
(45) Date of Patent: Jul. 5, 2011

(54) ELECTRONIC DEVICE FOR DECODING NAVIGATION DATA BY USING PHASE ANGLE VARIATION AND METHOD THEREOF

(75) Inventor: Hung-Sheng Chen, Banqiao (TW)

(73) Assignee: Altek Corporation, Hsinchu (TW)

( * ) Notice: Subject to any disclaimer, the term of this patent is extended or adjusted under 35 U.S.C. 154(b) by 250 days.

(21) Appl. No.: 12/413,799

(22) Filed: Mar. 30, 2009

(65) Prior Publication Data

US 2010/0164795 A1 Jul. 1, 2010

(30) Foreign Application Priority Data

Dec. 26, 2008 (TW) .............................. 97150966 A

(51) Int. Cl.
 *G01S 19/23* (2010.01)
 *G01S 19/21* (2010.01)
 *G01S 19/54* (2010.01)

(52) U.S. Cl. ................................................. 342/357.62

(58) Field of Classification Search ............. 342/357.12, 342/357.62; G01S 19/54, 19/21
See application file for complete search history.

(56) References Cited

U.S. PATENT DOCUMENTS

| | | | |
|---|---|---|---|
| 6,184,822 B1 * | 2/2001 | Fenton et al. ............ | 342/357.69 |
| 6,272,189 B1 * | 8/2001 | Garin et al. ................... | 375/343 |
| 6,922,167 B2 * | 7/2005 | Gerein ...................... | 342/357.74 |
| 7,180,445 B2 * | 2/2007 | Martin et al. ............. | 342/357.68 |
| 7,486,717 B2 * | 2/2009 | De Wilde et al. ............ | 375/150 |
| 7,702,040 B1 * | 4/2010 | Yuan et al. .................... | 375/326 |
| 7,737,889 B1 * | 6/2010 | Goad ........................ | 342/357.36 |
| 7,760,139 B1 * | 7/2010 | Gorski-Popiel ........... | 342/357.36 |
| 2008/0316095 A1 * | 12/2008 | Murakami ............... | 342/357.12 |
| 2010/0259437 A1 * | 10/2010 | Dixon et al. .................... | 342/16 |

* cited by examiner

*Primary Examiner* — Thomas H Tarcza
*Assistant Examiner* — Frank McGue
(74) *Attorney, Agent, or Firm* — Stevens & Showalter LLP

(57) ABSTRACT

An electronic device for decoding a navigation data by using a phase angle variation and a method thereof are described, which includes the following steps. A phase angle difference between the first phase angle of the first navigation data and the second phase angle of the second navigation data from a satellite signal is calculated. When the phase angle difference is greater than 90 degrees, the first navigation data and the second navigation data are determined to have opposite signs. The second navigation data according to the first navigation data and the result is determined. Therefore, each data is interpreted through directly comparing whether the phase angle difference with the previous data is greater than 90 degrees or not, so that the correct rate in decoding the navigation data is increased.

8 Claims, 5 Drawing Sheets

ELECTRONIC DEVICE FOR DECODING NAVIGATION DATA BY USING PHASE ANGLE VARIATION AND METHOD THEREOF

CROSS-REFERENCE TO RELATED APPLICATIONS

This non-provisional application claims priority under 35 U.S.C. §119(a) on Patent Application No(s). 097150966 filed in Taiwan, R.O.C. on Dec. 26, 2008 the entire contents of which are hereby incorporated by reference.

BACKGROUND OF THE INVENTION

1. Field of Invention

The present invention relates to an electronic device for decoding navigation data and a method thereof, and more particularly to an electronic device for decoding navigation data by using a phase angle variation and a method thereof.

2. Related Art

A global positioning system (GPS) is a medium-range circular-orbit satellite navigation system, which can provide accurate positioning, velocity measurement, and high-precision time standards for most areas (98%) on the surface of the earth. The GPS is developed and maintained by the U.S. Department of Defense for fulfilling the demands of continuously and accurately determining three-dimensional positions, three-dimensional movements, and time for a military user at any place all over the world or in the near-earth space. The system includes 24 GPS satellites in space, 1 master control station, 3 data upload stations and 5 monitor stations, as well as a GPS receiver serving as a user terminal on the earth. Only 4 satellites are needed at least to determine a position and an altitude of the user terminal on the earth rapidly. The larger the number of connected satellites is, the more precise the decoded position is.

Thanks to the features of being free from weather conditions, a high global coverage rate (98%), and moveable positioning, in addition to military applications, the GPS is also widely used for civilian navigation (for example, airplane navigation, ship navigation, and vehicle navigation, etc.) and positioning (for example, vehicle antitheft, positioning of mobile communication devices), etc.

As the satellite orbits the earth, after the GPS has received satellite signals sent from the satellite, the intensities of satellite signals received by the GPS may vary corresponding to a different position of the satellite. For example, when the satellite is right above the GPS, the signal has a higher intensity. When the satellite is close to the ground, the signal has a lower intensity. Meanwhile, the satellite signals may also be deteriorated due to being interfered by other electromagnetic radiations, such that the GPS suffers from a poor signal receiving effect. Meanwhile, according to the Doppler's Law, the signals sent from the satellite may be influenced by a relative movement between the GPS and the satellite or other interference factors, and as a result, the frequency of the satellite signal received by the GPS and that of the signal sent by the satellite might have a slight frequency variation.

A conventional GPS utilizes a phase angle difference acquired from the previous navigation data and the subsequent navigation data to correct a tracking frequency, so as to obtain a tracking frequency for the next navigation data, i.e., approximating the tracking frequency by using the phase difference iteration of a single data. The GPS utilizes the corrected tracking frequency to lock a phase of the prompt code in the satellite signal, and then decodes each navigation data through determining a sign of the prompt real code.

But under the circumstances that the satellite signal is rather weak or interfered by noises, an incorrect phase angle difference may be generated, so that the precise tracking frequency fails to be obtained, and as a result, the navigation data is incorrectly decoded.

SUMMARY OF THE INVENTION

Accordingly, the present invention is directed to an electronic device for decoding navigation data by using a phase angle variation and a method thereof, so as to avoid generating an incorrect phase angle difference due to the influences of low satellite signal intensity or noises and thus fail to obtain a precise tracking frequency and fail to decode the navigation data correctly.

The method for decoding navigation data by using a phase angle variation applied in an electronic device with a global positioning system (GPS) according to the present invention includes the following steps: receiving a satellite signal; acquiring a first navigation data and a second navigation data from the satellite signal sequentially; calculating a first phase angle of the first navigation data and a second phase angle of the second navigation data; calculating a phase angle difference between the first phase angle and the second phase angle; when the phase angle difference is greater than 90 degrees, determining that the first navigation data and the second navigation data have opposite signs; when the phase angle difference is smaller than or equal to 90 degrees, determining that the first navigation data and the second navigation data have the same sign; and recording the second navigation data according to the first navigation data and the determining result.

The step of calculating a first phase angle of the first navigation data and a second phase angle of the second navigation data includes: using a phase lock loop (PLL) to acquire a prompt code; calculating a prompt real (IP) code and a prompt imaginary (QP) code by using a digital base-band signal (I/Q) and the prompt code; and calculating one of the first phase angle and the second phase angle according to the prompt real code and the prompt imaginary code.

The method for decoding navigation data by using a phase angle variation further includes: recording the first navigation data as logic 0. The step of determining that the first navigation data and the second navigation data have opposite signs when the phase angle difference is greater than 90 degrees and recording the second navigation data according to the first navigation data and the determining result includes: determining that the first navigation data and the second navigation data have opposite signs, and recording the second navigation data as logic 1. The step of determining that the first navigation data and the second navigation data have the same sign when the phase angle difference is smaller than or equal to 90 degrees and recording the second navigation data according to the first navigation data and the determining result includes: determining that the first navigation data and the second navigation data have the same sign; and recording the second navigation data as logic 0.

The method for decoding navigation data by using a phase angle variation further includes: recording the first navigation data as logic 1. The step of determining that the first navigation data and the second navigation data have opposite signs when the phase angle difference is greater than 90 degrees and recording the second navigation data according to the first navigation data and the determining result includes: determining that the first navigation data and the second navigation data have opposite signs; and recording the second navigation data as logic 0. The step of determining that the first navigation data and the second navigation data have the same sign when the phase angle difference is smaller than or equal to 90 degrees and recording the second navigation data according to the first navigation data and the determining result includes: determining that the first navigation data and the second navigation data have the same sign; and recording the second navigation data as logic 1.

The electronic device for decoding navigation data by using a phase angle variation according to the present invention includes: an antenna module, an analog to digital converter, and a processing module.

The analog to digital converter is electrically connected to the antenna module.

The processing module is electrically connected to the analog to digital converter.

The antenna module receives a satellite signal. Then, the analog to digital converter converts the satellite signal into a plurality of navigation data sequentially. Finally, the processing module calculates a phase angle difference between every two neighboring navigation data from the plurality of navigation data. When the phase angle difference is greater than 90 degrees, it is determined that the every two neighboring navigation data have opposite signs; when the phase angle difference is smaller than or equal to 90 degrees, it is determined that the every two neighboring navigation data have the same sign.

In the electronic device for decoding navigation data by using a phase angle variation according to the present invention and the method thereof, a plurality of navigation data for one of a plurality of satellites is received continuously in advance to obtain a phase angle of each navigation data, and then a phase angle of the previous navigation data and a phase angle of the subsequent data are calculated to obtain a phase angle difference. When the phase angle difference is greater than 90 degrees, it is determined that the previous data and the subsequent data have opposite signs; and when the phase angle difference is smaller than or equal to 90 degrees, it is determined that the previous data and the subsequent data have the same sign; and the subsequent data is recorded according to the previous data and the determining result. Accordingly, the method for decoding navigation data by using a phase angle variation according to the present invention is irrelevant to the correction of a tracking frequency, but interprets each navigation data through directly comparing whether the phase angle difference between the previous navigation data and the subsequent navigation data is greater than 90 degrees or not, and thus, the correct rate in decoding the navigation data is increased, and the sensitivity of the GPS is enhanced as well.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

Figure 1:
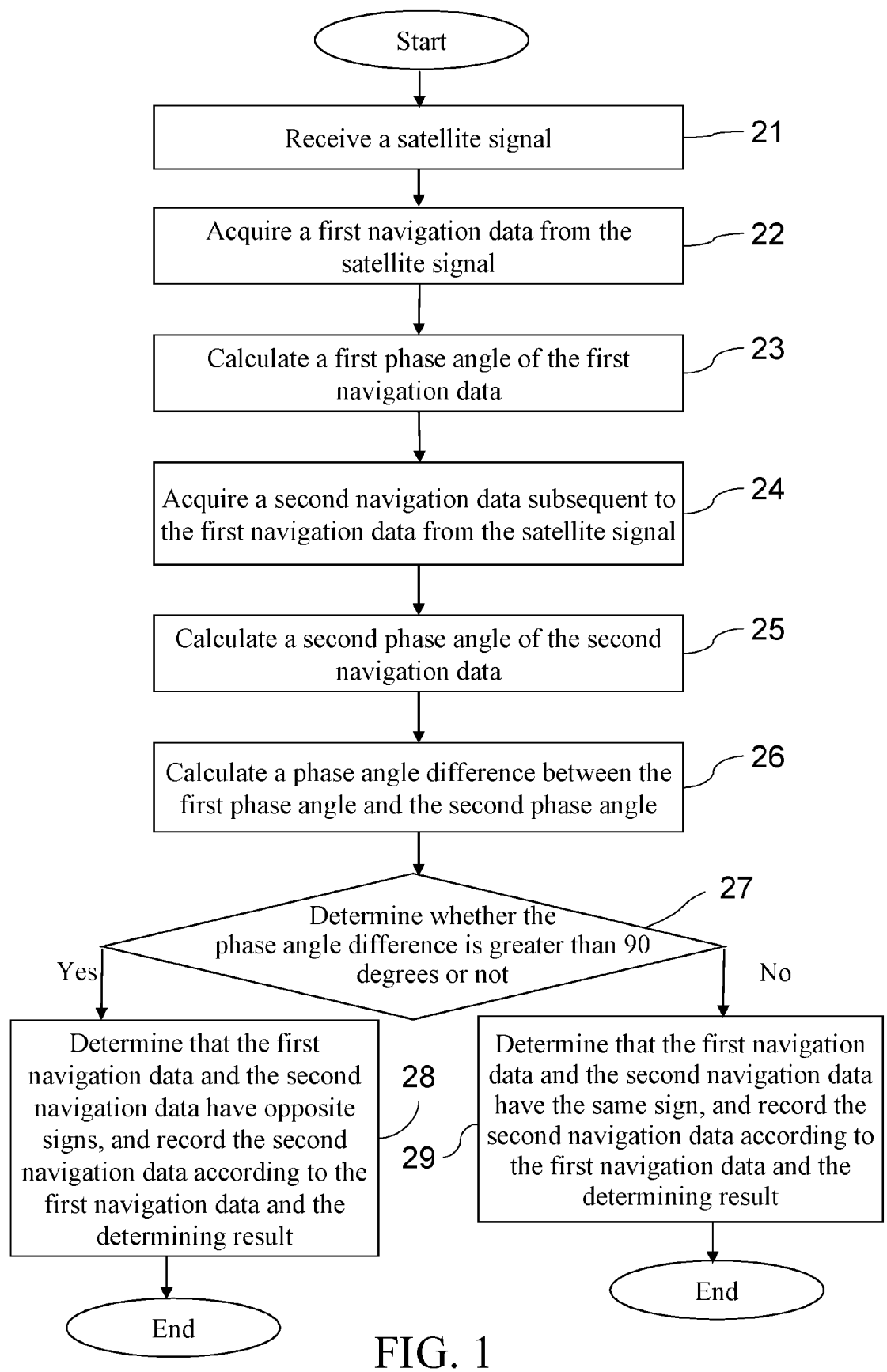
FIG. 1 is a flow chart of a method for decoding navigation data by using a phase angle variation according to the present invention.

FIG. 1 is a flow chart of a method for decoding navigation data by using a phase angle variation according to the present invention.

Referring to FIG. 1, the method for decoding navigation data by using a phase angle variation applied in an electronic device with a global positioning system (GPS) according to an embodiment of the present invention includes the steps of: receiving a satellite signal (Step 21); acquiring a first navigation data from the satellite signal (Step 22); calculating a first phase angle of the first navigation data (Step 23); acquiring a second navigation data subsequent to the first navigation data from the satellite signal (Step 24); calculating a second phase angle of the second navigation data (Step 25); calculating a phase angle difference between the first phase angle and the second phase angle (Step 26); determining whether the phase angle difference is greater than 90 degrees or not (Step 27); when the phase angle difference is greater than 90 degrees, determining that the first navigation data and the second navigation data have opposite signs, and recording the second navigation data according the first navigation data and the determining result (Step 28); and when the phase angle difference is smaller than or equal to 90 degrees, determining that the first navigation data and the second navigation data have the same sign, and recording the second navigation data according to the first navigation data and the determining result (Step 29).

As the satellite orbits the earth, when a GPS is receiving satellite signals sent from the satellite, the intensities of the satellite signals received by the GPS might vary as the position of the satellite changes. For example, when the satellite is right above the GPS, the atmospheric layer where the signal passes through is relatively thin, so that the signal has a higher intensity. When the satellite is close to the ground, the atmospheric layer where the signal passes through is relatively thick, so that the signal may have a lower intensity. Meanwhile, the satellite signals may also be interfered by other electromagnetic radiations, and as a result, the GPS suffers from a poor signal receiving effect. According to Doppler's Law, the signals sent by the satellite may be influenced by a relative movement between the GPS and the satellite or other interference factors, so that the frequency of the satellite signal received by the GPS and that of the signal sent by the satellite may have a slight frequency variation.

Accordingly, in order to receive satellite signals precisely, a GPS uses a plurality of tracking frequencies in a given frequency range to detect a satellite, so as to receive satellite signals from the satellite. The satellite can be detected at all the plurality of tracking frequencies in the given frequency range. However, only the tracking frequency where the most intense satellite signal is received is the frequency that is most approximate to that of the satellite signal influenced by the Doppler Effect.

Therefore, as for the method for decoding navigation data by using a phase angle variation according to the present invention, in Step 21, satellites are searched in a predetermined frequency range (e.g., if three satellites are searched, the longitude and latitude of a position of the GPS can be acquired, and if four satellites are searched, the longitude, latitude, and altitude of the position of the GPS can be acquired). Once the satellites are searched, satellite signals sent by the satellites are continuously received at a tracking frequency where a satellite signal with the maximum intensity is received.

Next, in Step 22, a first navigation data is acquired from the received satellite signal with the maximum intensity. Then, in Step 23, a first phase angle is calculated from the first navigation data. After that, in Step 24, after the first navigation data is acquired, a second navigation data is acquired from the satellite signal with the maximum intensity. Then, in Step 25, a second phase angle is calculated from the second navigation data.

Figure 2:
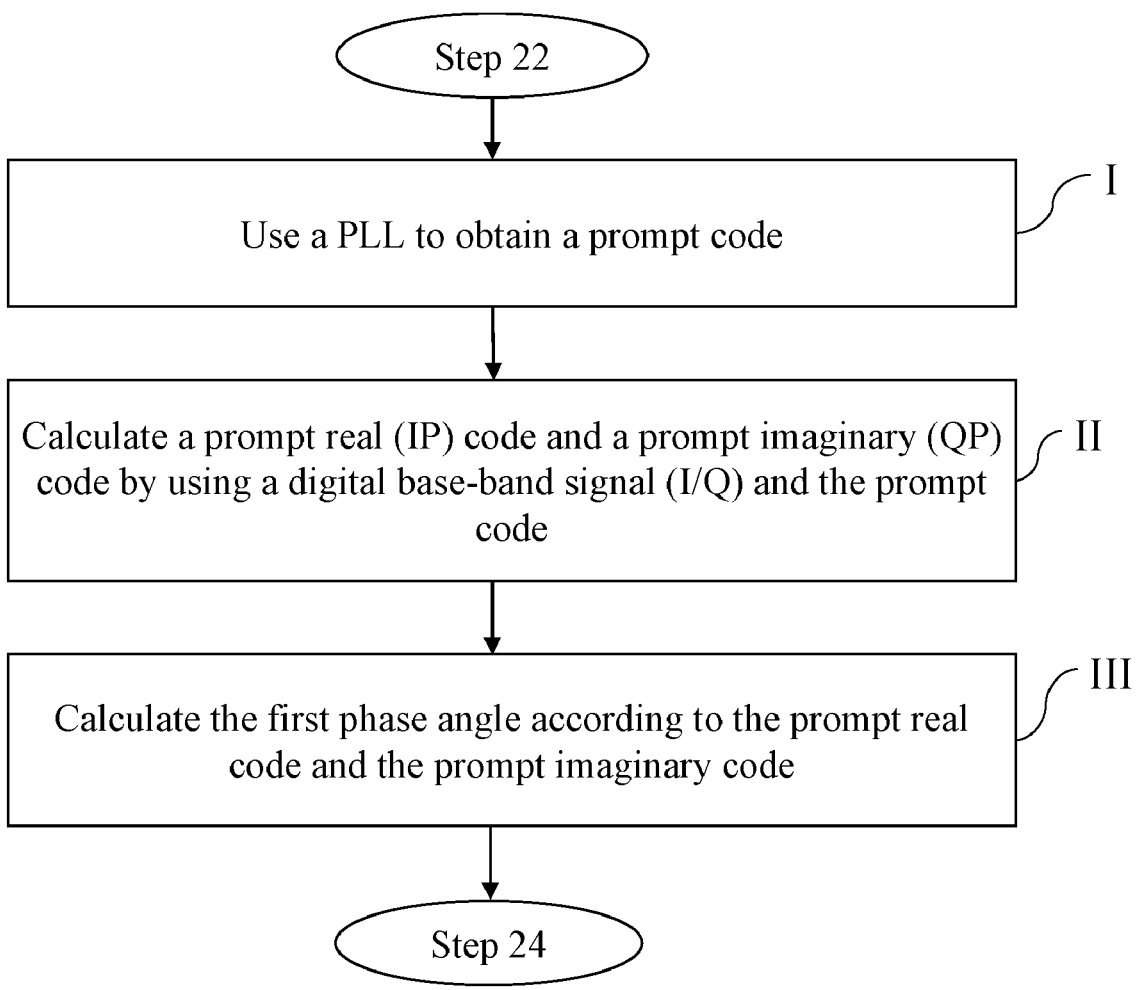
FIG. 2 is a flow chart of a process for calculating a first phase angle from a first navigation data according to the present invention.

Referring to FIG. 2, with reference to the above embodiment together, the process for calculating the first phase angle from the first navigation data in Step 23 further includes: using a PLL (Phase Lock Loop) to obtain a prompt code (Step I); calculating a prompt real (IP) code and a prompt imaginary (QP) code by using a digital base-band signal (I/Q) and the prompt code (Step II); and calculating the first phase angle according to the prompt real code and the prompt imaginary code (Step III).

Figure 3:
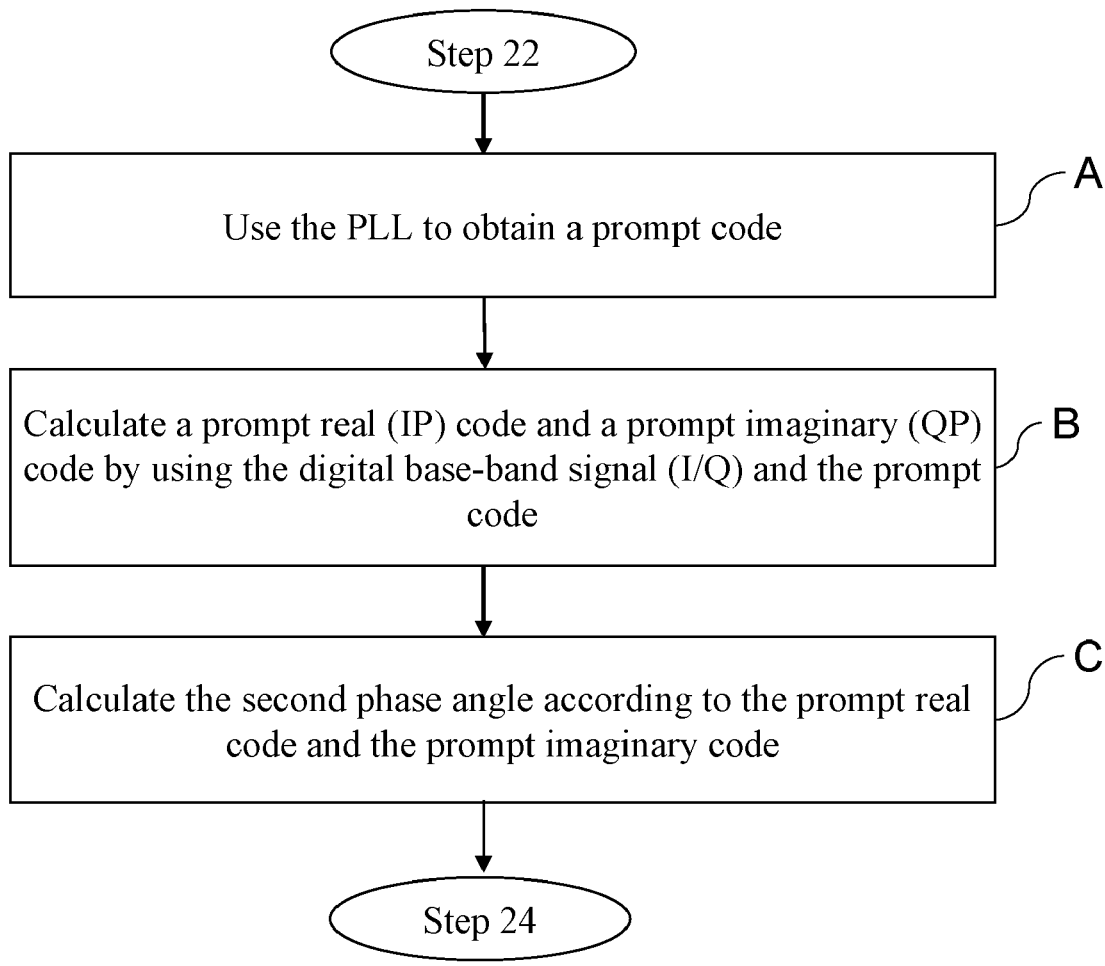
FIG. 3 is a flow chart of a process for calculating a second phase angle from a second navigation data according to the present invention.

Referring to FIG. 3, with reference to the above embodiment together, the process for calculating the second phase angle from the second navigation data in Step 25 further includes: using the PLL to obtain a prompt code (Step A); calculating a prompt real (IP) code and a prompt imaginary (QP) code by using the digital base-band signal (I/Q) and the prompt code (Step B); and calculating the second phase angle according to the prompt real code and the prompt imaginary code (Step C).

The GPS acquires a plurality of data (including the first navigation data and the second navigation data) from the satellite signal with the maximum intensity obtained by tracking the satellite with the tracking frequency, and calculates a phase angle of each data according to each data, e.g., obtaining the first phase angle according to the first navigation data, obtaining the second phase angle according to the second navigation data and so on.

A PLL exists inside the GPS. When the GPS receives a satellite signal and the received satellite signal is processed by the PLL, three timing codes are obtained, which are respectively Early code, Prompt code, and Late code.

The prompt real (IP) code and the prompt imaginary (QP) code may be calculated according to the obtained prompt code and the digital base-band signal (I/Q). The phase angle (the first phase angle) is calculated through dividing the prompt imaginary (QP) code by the prompt real (IP) code in Step III. The phase angle (the second phase angle) is calculated through dividing the prompt imaginary (QP) code by the prompt real (IP) code in Step C. The phase angle ($\theta$) is calculated by using an a tan of a trigonometric function, which is calculated as below:

$$a\tan(QP/IP)=\theta.$$

For example, a Prompt 1 is obtained after processing the first navigation data by the PLL. A Prompt Real 1 (IP1) and a Prompt Imaginary 1 (QP1) are calculated by using the Prompt 1 and the digital base-band signal (I/Q). The first phase angle ($\theta 1$) is calculated through the a tan of a trigonometric function by using the Prompt Real 1 (IP1) and the Prompt imaginary (QP1), which is calculated as below:

$$a\tan(QP1/IP1)=\theta 1.$$

Furthermore, a Prompt 2 is obtained after processing the second navigation data by the PLL. A Prompt Real 2 (IP2) and a Prompt Imaginary 2 (QP2) are calculated by using the Prompt 2 and the digital base-band signal (I/Q). The second phase angle ($\theta 2$) is calculated through the a tan of a trigonometric function by using the Prompt Real 2 (IP2) and the Prompt Imaginary (QP2), which is calculated as below:

$$a\tan(QP2/IP2)=\theta 2.$$

In Step 26, once a plurality of phase angles is calculated according to a plurality of data, a phase angle of a previous data is subtracted from a phase angle of a subsequent data among the plurality of phase angles, so as to obtain a phase angle difference between the previous data and the subsequent data. For example, the phase angle difference between the first navigation data and the second navigation data is calculated by subtracting the first phase angle of the first navigation data from the second phase angle of the second navigation data.

Next, in Step 27, it is determined whether the phase angle difference between the first navigation data and the second navigation data is greater then 90 degrees or not.

Because the satellite broadcasts one navigation data per 1 microsecond (ms), and broadcasts 1 bit navigation data per 20 ms, i.e., the satellite broadcasts 50 bits navigation data per second. That is to say, in a satellite signal, a time interval for each data is 1 ms.

Figure 4:
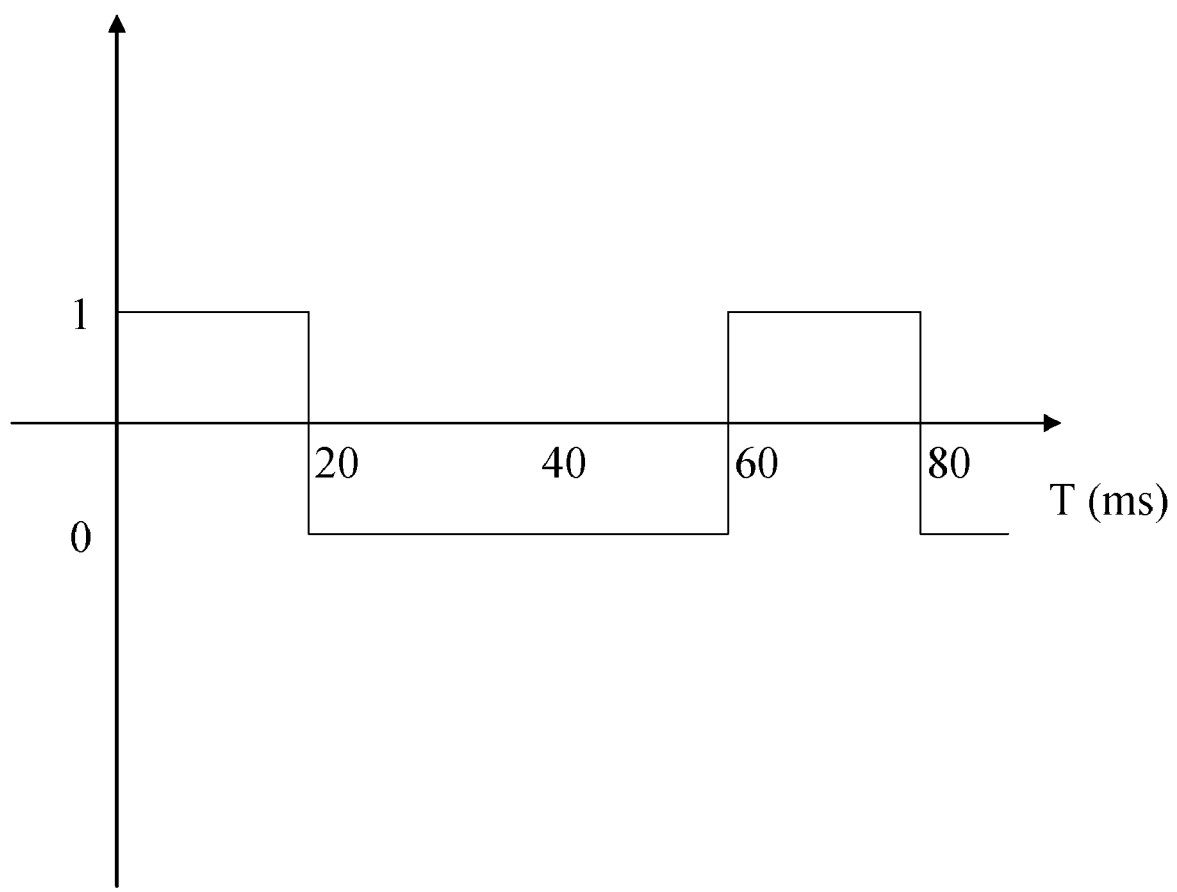
FIG. 4 is a schematic view of a satellite signal according to the present invention.

Upon receiving the satellite signal, the GPS converts the navigation data in the satellite signal from an analog signal into a digital signal, in which the phase variation in the navigation data is converted into a 2-bit digital signal formed by logic 0 and logic 1. As seen from FIG. 4 that, the satellite signal carries a plurality of navigation data for representing the digital signal logic 1 and the digital signal logic 0. The neighboring digital signal logic 1 and digital signal logic 0 respectively represent that the received previous navigation data and subsequent navigation data are respectively located in different quadrants.

Therefore, when the phase angle difference is greater than 90 degrees, it is determined that the digital signals of the first navigation data and the second navigation data have opposite signs, and the digital signal of the second navigation data is recorded according to the digital signal of the first navigation data and the determining result in Step 28. When the phase angle difference is smaller than or equal to 90 degrees, it is determined that the digital signals of the first navigation data and the second navigation data have the same sign, and the digital signal of the second navigation data is recorded according to the digital signal of the first navigation data and the determining result in Step 29.

For example, when the GPS records the first navigation data as logic 0 and the phase angle difference between the first navigation data and the second navigation data is greater than 90 degrees, the step of determining that the first navigation data and the second navigation data have opposite signs, and recording the second navigation data according to the first navigation data and the determining result includes determining that the first navigation data and the second navigation data have opposite signs and recording the second navigation data as logic 1.

When the GPS records the first navigation data as logic 0 and the phase angle difference between the first navigation data and the second navigation data is smaller than or equal to 90 degrees, the step of determining that the first navigation data and the second navigation data have the same sign and recording the second navigation data according to the first navigation data and the determining result includes determining that the first navigation data and the second navigation data have the same sign and recording the second navigation data as logic 0.

When the GPS records the first navigation data as logic 1 and the phase angle difference between the first navigation data and the second navigation data is greater than 90 degrees, the step of determining that the first navigation data and the second navigation data have opposite signs and recording the second navigation data according to the first navigation data and the determining result includes determining that the first navigation data and the second navigation data have opposite signs and recording the second navigation data as logic 0.

When the GPS records the first navigation data as logic 1 and the phase angle difference between the first navigation data and the second navigation data is smaller than or equal to 90 degrees, the step of determining that the first navigation data and the second navigation data have the same sign and recording the second navigation data according to the first navigation data and the determining result includes determining that the first navigation data and the second navigation data have the same sign and recording the second navigation data as logic 1.

Therefore, the method for decoding navigation data by using a phase angle variation according to the present invention interprets each data through directly comparing whether the phase angle difference between the previous data and the subsequent data is greater than 90 degrees or not, which increases the correct rate in decoding the navigation data, and enhances the sensitivity of the GPS.

Figure 5:
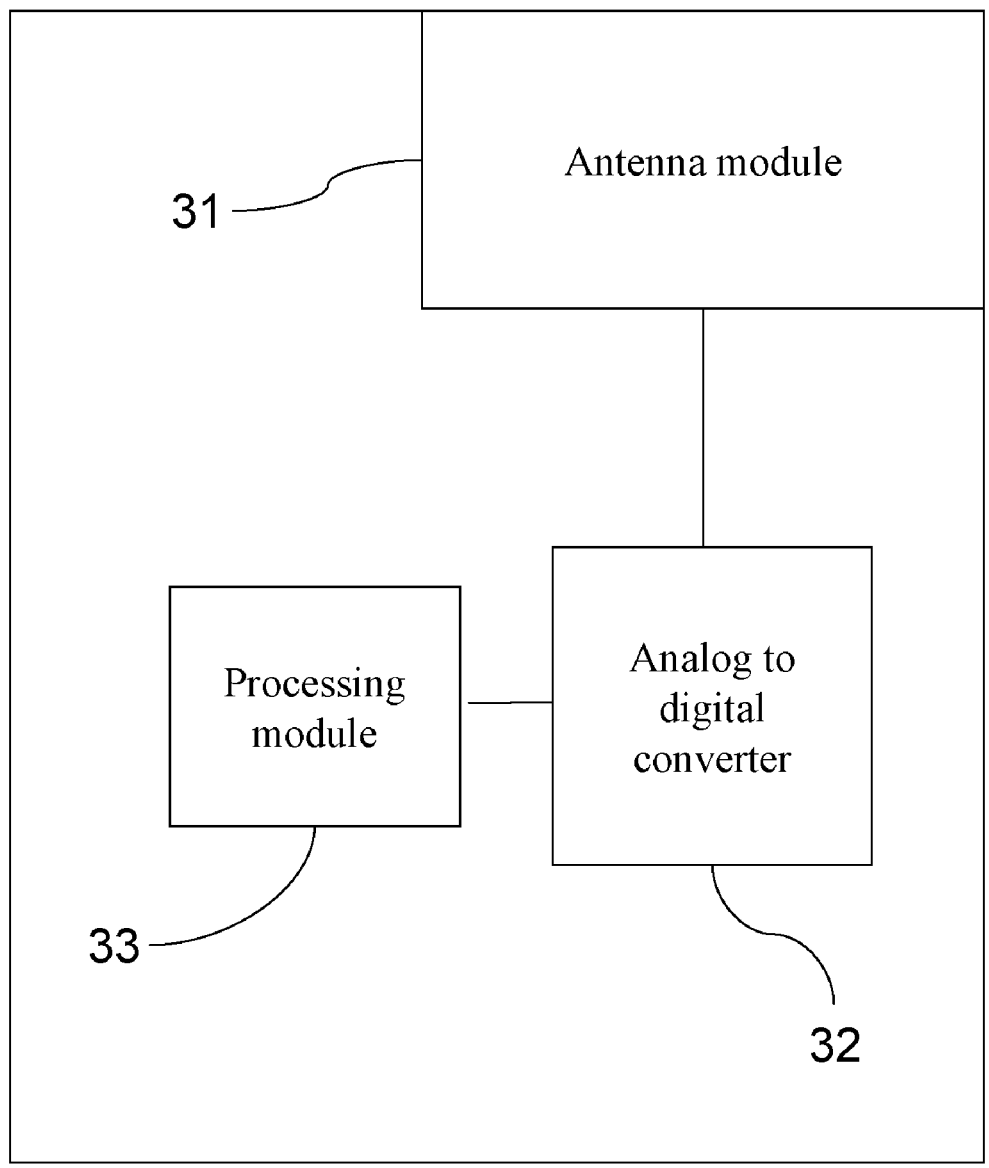
FIG. 5 is a schematic view of an electronic device for decoding navigation data by using a phase angle variation according to the present invention.

FIG. 5 is a schematic view of an electronic device for decoding navigation data by using a phase angle variation according to the present invention.

Referring to FIG. 5, with reference to the above embodiment, the electronic device for decoding navigation data by using a phase angle variation according to the present invention includes: an antenna module 31, an analog to digital converter 32, and a processing module 33.

The antenna module 31 receives a satellite signal. Then, the analog to digital converter 32 sequentially converts the satellite signal into a plurality of navigation data (e.g., the first navigation data, the second navigation data, etc.). Finally, the processing module 33 calculates a phase angle difference of every two neighboring navigation data from the plurality of navigation data (e.g., the first navigation data, the second navigation data, etc.). When the phase angle difference is greater than 90 degrees, it is determined that the every two neighboring navigation data have opposite signs (e.g., the first navigation data and the second navigation data have opposite signs); when the phase angle difference is smaller than or equal to 90 degrees, it is determined that the every two neighboring navigation data have the same sign (e.g., the first navigation data and the second navigation data have the same sign).

Therefore, the electronic device for decoding navigation data by using a phase angle variation according to the present invention interprets each data through directly comparing whether the phase angle difference between the previous data and the subsequent data is greater than 90 degrees or not, which increases the correct rate in decoding the navigation data, and enhances the sensitivity of the GPS.

Accordingly, the method for decoding navigation data by using a phase angle variation according to the present invention is irrelevant to the correction of a tracking frequency, but interprets each data through directly comparing whether the phase angle difference between the previous data and the subsequent data is greater than 90 degrees or not, and thus, the correct rate in decoding the navigation data is increased, and the sensitivity of the GPS is enhanced as well.

What is claimed is:

1. A method for decoding a navigation data by using a phase angle variation applied in an electronic device with a global positioning system (GPS), the method comprising:
   receiving a satellite signal;
   acquiring a first navigation data from the satellite signal;
   calculating a first phase angle of the first navigation data;
   acquiring a second navigation data subsequent to the first navigation data from the satellite signal;
   calculating a second phase angle of the second navigation data;
   calculating a phase angle difference between the first phase angle and the second phase angle;
   determining whether the phase angle difference is greater than 90 degrees or not;
   when the phase angle difference is greater than 90 degrees, determining that the second navigation data is opposite to the first navigation data, and recording the second navigation data; and
   when the phase angle difference is smaller than or equal to 90 degrees, determining that the second navigation data is the same as the first navigation data, and recording the second navigation data.

2. The method for decoding a navigation data by using a phase angle variation according to claim 1, wherein the step of calculating a first phase angle of the first navigation data comprises:
   using a phase lock loop (PLL) to acquire a prompt code;
   calculating a prompt real code and a prompt imaginary code by using a digital base-band signal and the prompt code; and
   calculating the first phase angle according to the prompt real code and the prompt imaginary code.

3. The method for decoding a navigation data by using a phase angle variation according to claim 1, wherein the step of calculating a second phase angle of the second navigation data comprises:
   utilizing a PLL to obtain a prompt code;
   calculating a prompt real code and a prompt imaginary code by using a digital base-band signal and the prompt code; and
   calculating the second phase angle according to the prompt real code and the prompt imaginary code.

4. The method for decoding a navigation data by using a phase angle variation according to claim 1, further comprising:
   recording the first navigation data as logic 0;
   wherein the step of determining that the first navigation data and the second navigation data have opposite signs when the phase angle difference is greater than 90 degrees and recording the second navigation data according to the first navigation data and the determining result comprises: determining that the first navigation data and the second navigation data have opposite signs; and recording the second navigation data as logic 1.

5. The method for decoding a navigation data by using a phase angle variation according to claim 1, further comprising:
   recording the first navigation data as logic 1;
   wherein the step of determining that the first navigation data and the second navigation data have opposite signs when the phase angle difference is greater than 90 degrees and recording the second navigation data according to the first navigation data and the determining result comprises: determining that the first navigation data and the second navigation data have opposite signs; and recording the second navigation data as logic 0.

6. The method for decoding a navigation data by using a phase angle variation according to claim 1, further comprising:
recording the first navigation data as logic 0;
wherein the step of determining that the first navigation data and the second navigation data have the same sign when the phase angle difference is smaller than or equal to 90 degrees and recording the second navigation data according to the first navigation data and the determining result comprises: determining that the first navigation data and the second navigation data have the same sign; and recording the second navigation data as logic 0.

7. The method for decoding a navigation data by using a phase angle variation according to claim 1, further comprising:
recording the first navigation data as logic 1;
wherein the step of determining that the first navigation data and the second navigation data have the same sign when the phase angle difference is smaller than or equal to 90 degrees and recording the second navigation data according to the first navigation data and the determining result comprises: determining that the first navigation data and the second navigation data have the same sign; and recording the second navigation data as logic 1.

8. An electronic device for decoding a navigation data by using a phase angle variation, comprising:
an antenna module, adapted to receive a satellite signal;
an analog to digital converter, electrically connected to the antenna module, adapted to convert the satellite signal into a plurality of navigation data sequentially; and
a processing module, electrically connected to the analog to digital converter, adapted to calculate a phase angle difference of every two neighboring navigation data from the plurality of navigation data, wherein when the phase angle difference is greater than 90 degrees, the processing module determines that the every two neighboring navigation data have opposite signs; when the phase angle difference is smaller than or equal to 90 degrees, the processing module determines that the every two neighboring navigation data have the same sign.

* * * * *